Dec. 7, 1954  C. J. HICKS  2,696,161
COOKING UTENSIL OF THE WAFFLE IRON TYPE
Filed Aug. 4, 1952  2 Sheets-Sheet 1

Claude J. Hicks
INVENTOR.

BY *Clarence A. O'Brien*
*and Harvey B. Jackson*
Attorneys

Dec. 7, 1954  C. J. HICKS  2,696,161
COOKING UTENSIL OF THE WAFFLE IRON TYPE
Filed Aug. 4, 1952  2 Sheets-Sheet 2
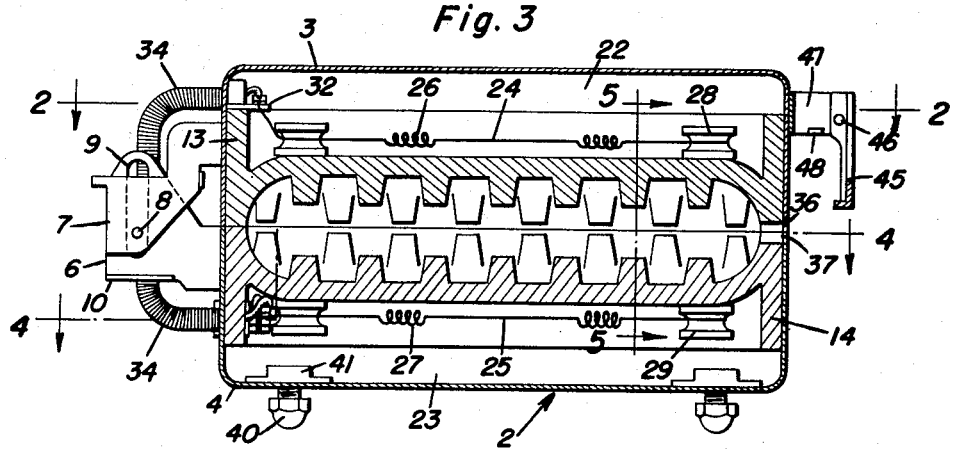
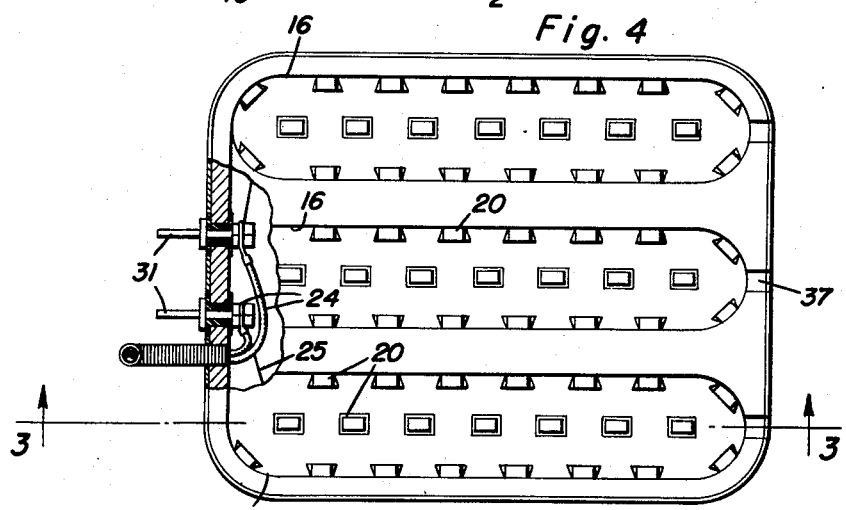
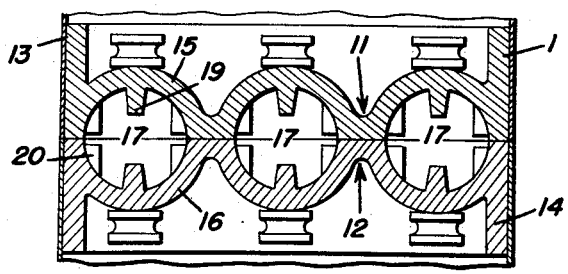
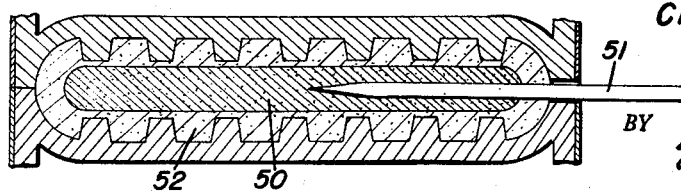
Claude J. Hicks
INVENTOR.

United States Patent Office 2,696,161
Patented Dec. 7, 1954

2,696,161

COOKING UTENSIL OF THE WAFFLE IRON TYPE

Claude J. Hicks, Stoughton, Wis.

Application August 4, 1952, Serial No. 302,529

1 Claim. (Cl. 99—381)

My invention relates to improvements in cooking utensils of the waffle iron type for cooking weiners in waffle dough to form a sandwich product.

The primary object of my invention is to provide an improved cooking utensil of the type designated especially adapted for cooking weiners rolled and encased in waffle iron dough with the weiner impaled on a skewer inserted in one end thereof before the rolling and cooking operations so that both the uncooked and cooked product may be handled by the skewer to avoid direct contact of the hands with the product.

Another object is to provide a utensil for the above purpose which is equipped with improved means for cooking both the weiner and encasing waffle dough uniformly, and to provide the utensil with novel improved means for venting moisture out of the same so as to prevent the cooked product from being soggy.

Other subordinate objects, within the purview of my invention, together with the precise nature of my improvements will be readily understood when the succeeding description and claim are read with reference to the drawings, accompanying and forming part of this specification.

In said drawings:

Figure 3 is a view in vertical longitudinal section taken on the line 3—3 of Figure 4;

Figure 4 is a view in horizontal section taken on the line 4—4 of Figure 3;

Figure 5 is a fragmentary view in vertical transverse section taken on the line 5—5 of Figure 3;

Figure 6 is a fragmentary view in longitudinal section illustrating the product impaled on the skewer and positioned in one of the molds.

Figure 1:
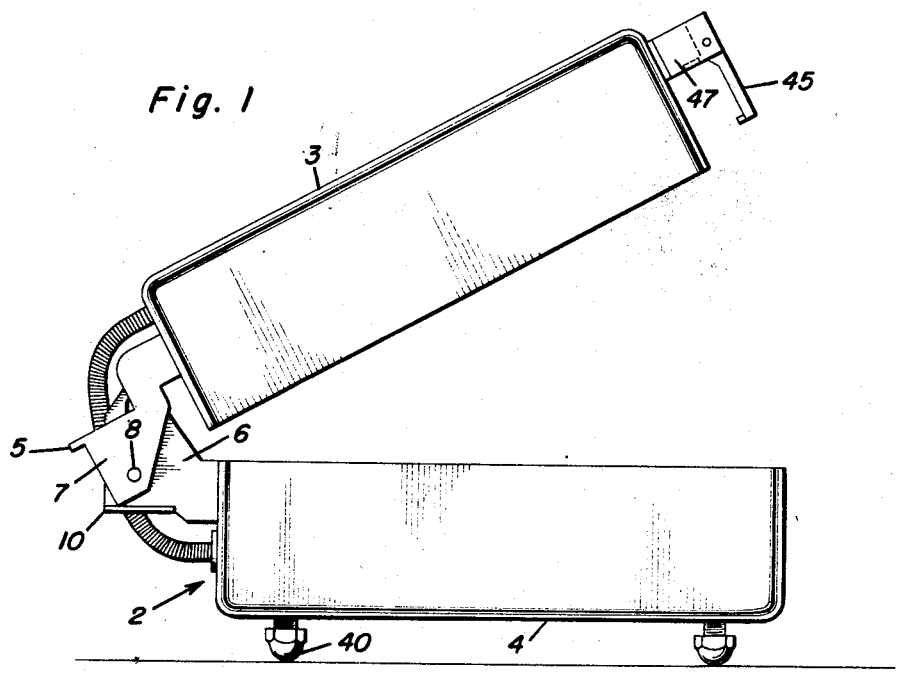
Figure 1 is a view in side elevation of my improved utensil, in the preferred embodiment thereof, with the top section swung upwardly to open the utensil.
Figure 2:
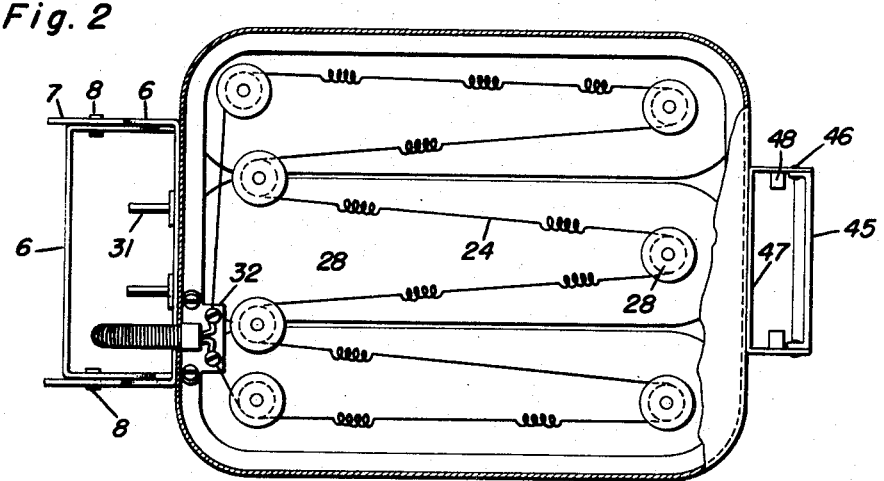
Figure 2 is a view partly in horizontal section and partly in plan taken on the line 2—2 of Figure 3.

Referring to the drawings by numerals, and first to Figures 1 to 6, in the preferred embodiment, the utensil of my invention comprises an elongated, rectangular hollow casing 2, of aluminum, stainless steel, or other suitable material, divided in its median plane to provide top and bottom casing half sections 3, 4. The sections 3, 4 are hinged together at one end of the casing, constituting the rear end, by means of a rectangular hinge frame 6 suitably secured horizontally to the rear end of the bottom section 4 in a plane parallel with the plane of said section 4, a pair of rearwardly and downwardly extending hinge plates 7 suitably fixed to the rear end of the top section 3 and straddling the frame 6, and lateral hinge studs 8 on said plates 7 pivoting and vertically slidable in vertical slots 9 in the opposite ends of the frame 6. As will be seen, the described hinge means provides for vertical swinging of the top section to open and close the casing 2 and mating of said sections 3, 4 in edge to edge relation when the casing 2 is closed, the studs 8 and slots 9 providing for vertical tilting of the top section 3 at the rear end of the casing 2 for a purpose presently clear. Stop lugs 5 on the plates 7 are adapted to engage stop lugs 10 on the frame 6 to limit upward swinging of the top section 2.

A pair of top and bottom mold plates 11, 12, of cast aluminum, or the like, with flanged edges 13, 14 are fitted in the top and bottom sections 3, 4 and which form top and bottom half mold sections 15, 16 which mate when the casing 2 is closed to form a plurality of sausage-shaped, duplicate molds 17 extending side by side in a common horizontal plane longitudinally of the casing 2. The mold sections 15, 16 are formed internally with circumferentially spaced, longitudinally extending rows, of heat conveying tapered lugs 19, 20, the lugs in one row being staggered relative to the lugs in adjacent rows. The mold plates 11, 12 are spaced from the top and bottom of the top and bottom sections 3, 4 to provide heating chambers 22, 23 in said top and bottom sections 2, 3.

Electrical heating means is provided in each of the heating chambers 22, 23 comprising wire heating elements 24, 25 in said chambers, respectively, with resistance coils 26, 27 formed therein. The wire heating elements 24, 25 are looped in zigzag arrangement around porcelain insulators 28, 29 on the mold sections 15, 16, respectively. The ends of the wire element 25 are suitably connected to a pair of plug prongs 31 suitably extended into the rear end of the bottom section 4 and to which the usual electric service cable, not shown, may be connected by the usual plug, not shown. The ends of the upper wire element 24 are fastened to a suitable clamp 32 in the heating chamber 22 of the top section 3 and led out of said section and into the rear end of the bottom section 4 and connected to said plug prongs 31. A suitable flexible conduit 34 has its ends suitably fixed to and opening into the rear ends of the sections 3, 4 and houses the ends of the wire element 24 where said element extends out of and into the sections 3, 4. The current to the heating elements 24, 25 may be controlled by any suitable type of switch.

Grooves 36, 37 extend through the front end of the sections 3, 4 and the front ends of the molds 17 and which mate when the top section 3 is swung into closing position to form openings at the front of the casing 2 for accommodating skewers in a manner presently explained.

Supporting feet 40 for the bottom section 4 are threaded upwardly into the bottom of said section into bosses 41 on said bottom of said section for adjustment to support the casing 2 at different levels.

A bail-type handle 45 at the front end of the top section 3 is pivoted, as at 46, on a U-shaped bracket 47 fixed to the front end of said section 3 so that the handle 45 normally hangs pendent forwardly of said section. The handle 45 is swingable upwardly against lateral lugs 48 on the bracket 47 into outstanding position for convenience in swinging the top section 3 into opening position.

Referring now to the use and operation of my invention, the weiners, one of which is shown at 50 in Figure 6, are impaled at one end on a skewer 51 and then rolled in waffle dough 52 to encase the same, using the skewers as handles. The uncooked products thus formed are placed in the lower sections 16 of the molds 17 with the skewers laid in and extending out of the lower grooves 37, as shown in Figure 6. The top section 3 is then closed to close the casing and the molds 17 and the uncooked products cooked with the skewers extending out of the openings formed by the mating grooves 36, 37. The lugs 19, 20 press into the waffle dough 52 close to the weiners 50 so that heat is conveyed close to the weiners to uniformly cook the same, also the waffle dough. Moisture accumulating in the molds 17 is permitted to escape to atmosphere by tilting of the top section 3 in the manner previously described. When the products are cooked, the top section 3 is swung upwardly into opening position to open the molds 17 and cooked products are removed by means of the skewers 51.

Figure 7:
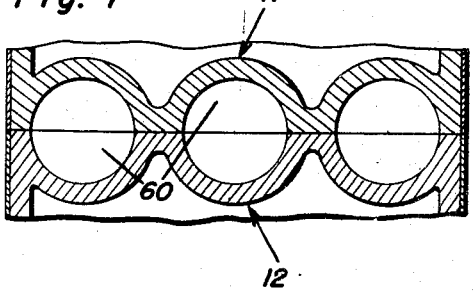
Figure 7 is a fragmentary view in vertical transverse section of a modified form of mold.

As shown in Figure 7, molds 60, smooth internally may be used in cooking a similar product in which the weiner has been partly precooked.

The foregoing will, it is believed, suffice to impart a clear understanding of my invention, without further explanation.

Manifestly, the invention, as described, is susceptible of modifications, without departing from the inventive concept, and right is herein reserved to such modifications as fall within the scope of the appended claim.

Having described the invention, what is claimed as new is:

A cooking utensil for molding an article of food being cooked comprising a pair of hollow top and bottom casing sections hinged together at one side thereof for closing in edge to edge engaging relation and for opening at the opposite side thereof, a pair of top and bottom mold plates in said casing sections having surrounding edge flanges fitted and fixed in said top and bottom casing sections and engaging edge to edge when said casing sections are closed, said plates including half mold sections closing in mating relation when the casing sections are closed to form closed molds, electric heating elements on said mold sections enclosed thereby and by said casing sections, top and bottom edge grooves in said other side of the casing sections and said flanges mating when the casing and mold sections are closed to form openings to said molds, and portable skewers extending through said openings into said molds for cooking of the articles of food thereon, said skewers when said casing and mold sections are open being removable from the bottom grooves to remove the articles of food therewith for transporting by said skewers.

References Cited in the file of this patent

UNITED STATES PATENTS

| Number | Name | Date |
|---|---|---|
| 1,609,317 | Smith | Dec. 7, 1926 |
| 1,915,962 | Vaughn | June 27, 1933 |
| 1,974,204 | Cooter | Sept. 18, 1934 |
| 1,990,412 | Merritt | Feb. 5, 1935 |
| 2,059,133 | Merritt | Oct. 27, 1936 |
| 2,086,477 | Restel | July 6, 1937 |
| 2,136,764 | Smith | Nov. 15, 1938 |
| 2,329,937 | Orkfritz | Sept. 21, 1943 |
| 2,478,529 | Farr et al. | Aug. 9, 1949 |
| 2,558,294 | Finzie | June 26, 1951 |